US011524366B2

(12) United States Patent
Groninger et al.

(10) Patent No.: US 11,524,366 B2
(45) Date of Patent: Dec. 13, 2022

(54) SEPARATION AND RELEASE OF LASER-PROCESSED BRITTLE MATERIAL

(71) Applicant: Coherent Munich GmbH & Co. KG, Gilching (DE)

(72) Inventors: Stefan Groninger, Gilching (DE); Manfred Schadi, Munich (DE); Ludger Müllers, Gilching (DE); Jürgen Serbin, Gilching (DE)

(73) Assignee: Coherent Munich GmbH & Co. KG, Gilching (DE)

( * ) Notice: Subject to any disclaimer, the term of this patent is extended or adjusted under 35 U.S.C. 154(b) by 684 days.

(21) Appl. No.: 16/509,363

(22) Filed: Jul. 11, 2019

(65) Prior Publication Data

US 2020/0030917 A1  Jan. 30, 2020

Related U.S. Application Data

(60) Provisional application No. 62/703,806, filed on Jul. 26, 2018.

(51) Int. Cl.
*B23K 26/53* (2014.01)
*B23K 26/0622* (2014.01)
(Continued)

(52) U.S. Cl.
CPC .......... *B23K 26/53* (2015.10); *B23K 26/0622* (2015.10); *B23K 26/0626* (2013.01);
(Continued)

(58) Field of Classification Search
CPC ............ C03B 33/0222; B23K 26/1224; B23K 26/50–57; B23K 26/38–389; B23K 15/08–085
See application file for complete search history.

(56) References Cited

U.S. PATENT DOCUMENTS 3,742,182 A * 6/1973 Saunders ........... B23K 26/0661
219/121.84
5,593,606 A * 1/1997 Owen .................. H05K 3/0038
219/121.8
(Continued)

FOREIGN PATENT DOCUMENTS

WO    WO 2016/081548    *  5/2016    ............. C03B 33/09

OTHER PUBLICATIONS

Corning-NPL, Corning Museum of Glass, "All About Glass", Dec. 9, 2011, p. 1 (Year: 2011).*
(Continued)

*Primary Examiner* — Jimmy Chou
(74) *Attorney, Agent, or Firm* — Morrison & Foerster LLP (57) ABSTRACT

A method for separating and releasing a closed-form piece from a workpiece made of a brittle material is disclosed. A first pulsed laser-beam creates defects along the outline of the closed-form piece. A second laser-beam selectively heats the closed-form piece for a first time that is sufficient to initiate cracking between the defects. The heating is stopped for a period sufficiently long for the cracks to propagate completely between the defects. The second laser-beam is applied for a second time that causes melting and deformation of the closed-form piece. The deformation opens a gap between the closed-form piece and the rest of the workpiece, thereby allowing release of the closed-form piece.

22 Claims, 8 Drawing Sheets

(51) Int. Cl.
  *B23K 26/55* (2014.01)
  *B23K 26/70* (2014.01)
  *B23K 26/06* (2014.01)
  *B23K 26/08* (2014.01)
  *C03B 33/02* (2006.01)
  *B23K 103/00* (2006.01)

(52) U.S. Cl.
  CPC .......... *B23K 26/0869* (2013.01); *B23K 26/55* (2015.10); *B23K 26/702* (2015.10); *C03B 33/0222* (2013.01); *B23K 2103/52* (2018.08); *B23K 2103/54* (2018.08)

(56) References Cited

U.S. PATENT DOCUMENTS

| | | | | |
|---|---|---|---|---|
| 5,614,114 | A * | 3/1997 | Owen | C23C 14/28 205/112 |
| 7,807,942 | B2 * | 10/2010 | Shiozaki | B23K 26/21 219/121.68 |
| 8,748,774 | B2 * | 6/2014 | Suzuki | B23K 9/00 |
| 9,102,007 | B2 | 8/2015 | Hosseini | |
| 9,296,066 | B2 | 3/2016 | Hosseini et al. | |
| 11,111,170 | B2 * | 9/2021 | Bowden | C03B 33/0222 |
| 2007/0111390 | A1 * | 5/2007 | Komura | B23K 26/009 438/460 |
| 2008/0076267 | A1 * | 3/2008 | Oishi | G02F 1/1368 438/785 |
| 2009/0162606 | A1 * | 6/2009 | Hsu | C03B 33/04 264/154 |
| 2010/0326138 | A1 * | 12/2010 | Kumatani | B23K 26/082 65/286 |
| 2012/0135607 | A1 * | 5/2012 | Shimoi | B23K 26/55 438/705 |
| 2013/0224433 | A1 * | 8/2013 | Matsumoto | B23K 26/382 65/61 |
| 2015/0136743 | A1 | 5/2015 | Hosseini | |
| 2015/0165548 | A1 * | 6/2015 | Marjanovic | C03B 33/091 219/121.73 |
| 2015/0165563 | A1 * | 6/2015 | Manley | B23K 26/53 65/102 |
| 2015/0166396 | A1 * | 6/2015 | Marjanovic | B23K 26/04 428/137 |
| 2015/0306815 | A1 * | 10/2015 | Braden | B29C 59/16 156/272.8 |
| 2016/0082549 | A1 * | 3/2016 | Yoshida | B23K 26/389 219/121.7 |
| 2016/0251251 | A1 * | 9/2016 | Hirayama | B23K 26/382 65/105 |
| 2016/0280580 | A1 * | 9/2016 | Bohme | C03B 33/04 |
| 2016/0304386 | A1 * | 10/2016 | Dong | B23K 26/0622 |
| 2016/0347643 | A1 * | 12/2016 | Yamauchi | H01L 23/15 |
| 2016/0368086 | A1 * | 12/2016 | Lott | B23K 26/082 |
| 2017/0120390 | A1 * | 5/2017 | Seet | H05K 3/0035 |
| 2017/0225271 | A1 * | 8/2017 | Goodman | B23K 26/389 |
| 2018/0105451 | A1 | 4/2018 | Wieland | |
| 2018/0312432 | A1 * | 11/2018 | Horiuchi | B23K 26/384 |
| 2019/0119150 | A1 * | 4/2019 | Burket | C03C 23/0025 |
| 2019/0144325 | A1 * | 5/2019 | Bowden | C03B 33/0222 219/121.69 |
| 2020/0283325 | A1 * | 9/2020 | Levi | C03C 15/00 |
| 2022/0204393 | A1 * | 6/2022 | Noda | B23K 26/53 |

OTHER PUBLICATIONS

Adams, Laser Machinery and Drilling, Mar./Apr. 1965, IEEE Transactions on Industry and General Application, pp. 90-96 (Year: 1965).*

International Search Report and Written Opinion received for PCT Patent Application No. PCT/US2019/069721, dated Oct. 17, 2019, 11 pages.

* cited by examiner

SEPARATION AND RELEASE OF LASER-PROCESSED BRITTLE MATERIAL

PRIORITY

This application claims priority to U.S. Provisional Patent Application Ser. No. 62/703,806, filed Jul. 26, 2018, the entire disclosure of which is incorporated herein by reference.

TECHNICAL FIELD OF THE INVENTION

The present invention relates in general to cutting brittle materials using beams of laser-radiation. The invention relates in particular to separation and release of closed-forms from laser-processed brittle materials using a beam of laser-radiation.

DISCUSSION OF BACKGROUND ART

Laser material-processing is increasingly used for cutting, drilling, marking, and scribing a wide range of materials, including brittle materials such as glass, ceramics, silicon, and sapphire. Traditional mechanical processing produces unwanted defects, such as micro-cracks that may propagate when the processed brittle material is stressed, thereby degrading and weakening the processed brittle material. Laser-processing of brittle materials using focused beams of laser-radiation produces precise cuts and holes, having high-quality edges and walls, while minimizing the formation of such unwanted defects. Progress in scientific research and manufacturing is leading to laser-processing of an increasing range of brittle materials, while demanding increased processing speed and precision.

Transparent brittle materials interact with focused beams of pulsed laser-radiation through non-linear absorption of the laser-radiation. The pulsed laser-radiation may comprise a train of individual pulses, or rapid bursts of pulses. Each individual pulse or burst of pulses creates a defect in a workpiece of transparent brittle material at the focus of the beam. An article is cut from the workpiece by translating the focused beam to create a row of defects along a cutting line in the workpiece.

Often the row of defects just weakens the material along the cutting line. To fully separate the article from the rest of the workpiece requires an additional step of applying stress across the cutting line. Applying mechanical stress is sometimes sufficient to cause separation along the cutting line. Thermal stress is applied in applications that require high-quality edges, without unwanted defects such as chips and micro-cracks. Precise and controlled separation has been demonstrated using a laser-beam having a wavelength that is absorbed by the material and relatively high average power. The absorbed laser-power creates a thermal gradient across the cutting line, which causes cracks to propagate between the discrete defects produced by the pulsed laser-radiation, thereby forming a continuous break along the cutting line.

By way of example, a highly focused beam of ultra-short laser-pulses creates a self-guiding "filament" in a glass workpiece. Propagation of such a filament creates a long defect through the workpiece in the form of a void. A row of voids is created by translating the focused ultra-short pulsed laser-beam along the cutting line. A carbon dioxide ($CO_2$) laser having wavelengths of around 10 micrometers ($\mu m$) is then used to separate glass, by translating the $CO_2$ laser-beam along the cutting line. Such a laser-cutting process "SmartCleave" was developed by Rofin-Sinar Technologies Inc. and is described in U.S. Pat. Nos. 9,102,007 and 9,296,066, each thereof commonly owned, and the complete disclosure of each is hereby incorporated herein by reference. Another exemplary way to create a long defect in a workpiece is to focus a beam of ultra-short pules using aberrated focusing optics to create an extended focus along an optical axis of the focusing optic. The focused beam has sufficient intensity along the optic axis to remove glass by ablation and create an extended void.

Although the additional separation step of applying stress breaks any residual bonding between the article and the rest of the workpiece, in some applications the article is still physically inhibited from separating from the rest of the workpiece. This is a problem for articles having concave curved sections and for cutting processes that remove relatively little material and produce rough edges. For example, focused beams of ultra-short laser-pulses make precise and fine cuts in glass. Typical Rz surface roughness for a filament cutting or ablation cutting process using laser-pulses having a duration of about 10 picoseconds (ps) is about 10 $\mu m$. Even this modest surface roughness on the cut-edges causes sufficient stiction that prevents separation of curve sections.

Stiction is a particular problem for articles having small closed-form features, wherein the cutting line is the outline of material to be removed from a workpiece. For example, when creating a hole of a desired shape in a glass workpiece and the hole-piece to be discarded is inhibited from separating from the rest of the workpiece. In some instances, the hole-piece can be removed by applying sufficient mechanical force, but this force can damage an inside edge of the workpiece. If the hole-piece twists or catches the inside edge of the workpiece while being forced, the tilted hole-piece can become bound inside the article. If the tilted hole-piece is further forced, release will cause chipping of the inside edge of the workpiece.

There is need for a method of laser-cutting closed-form features from brittle materials, which provides reliable and clean separation of articles from the rest of the workpiece. Preferably, the method would require minimal additional apparatus and minimal additional processing time.

SUMMARY OF THE INVENTION

In one aspect, a method is disclosed for separating and releasing a closed-form piece from a workpiece made of a brittle material using a beam of laser-radiation. The method comprises providing a workpiece having a plurality of defects along an outline of the closed-form piece created by laser processing. The beam of laser-radiation is applied to the closed-form piece for a first duration. The beam of laser-radiation initiates cracking between the defects. Application of the beam of laser-radiation is paused while the cracking propagates completely between the defects. The beam of laser-radiation is applied for a second duration. The beam of laser-radiation heats at least a portion of the closed-form piece above the melting temperature of the brittle material. The melting causes deformation. Contraction of the deformed closed-form piece during cooling after the second duration opens a gap between the closed-form piece and the rest of the workpiece.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1A:
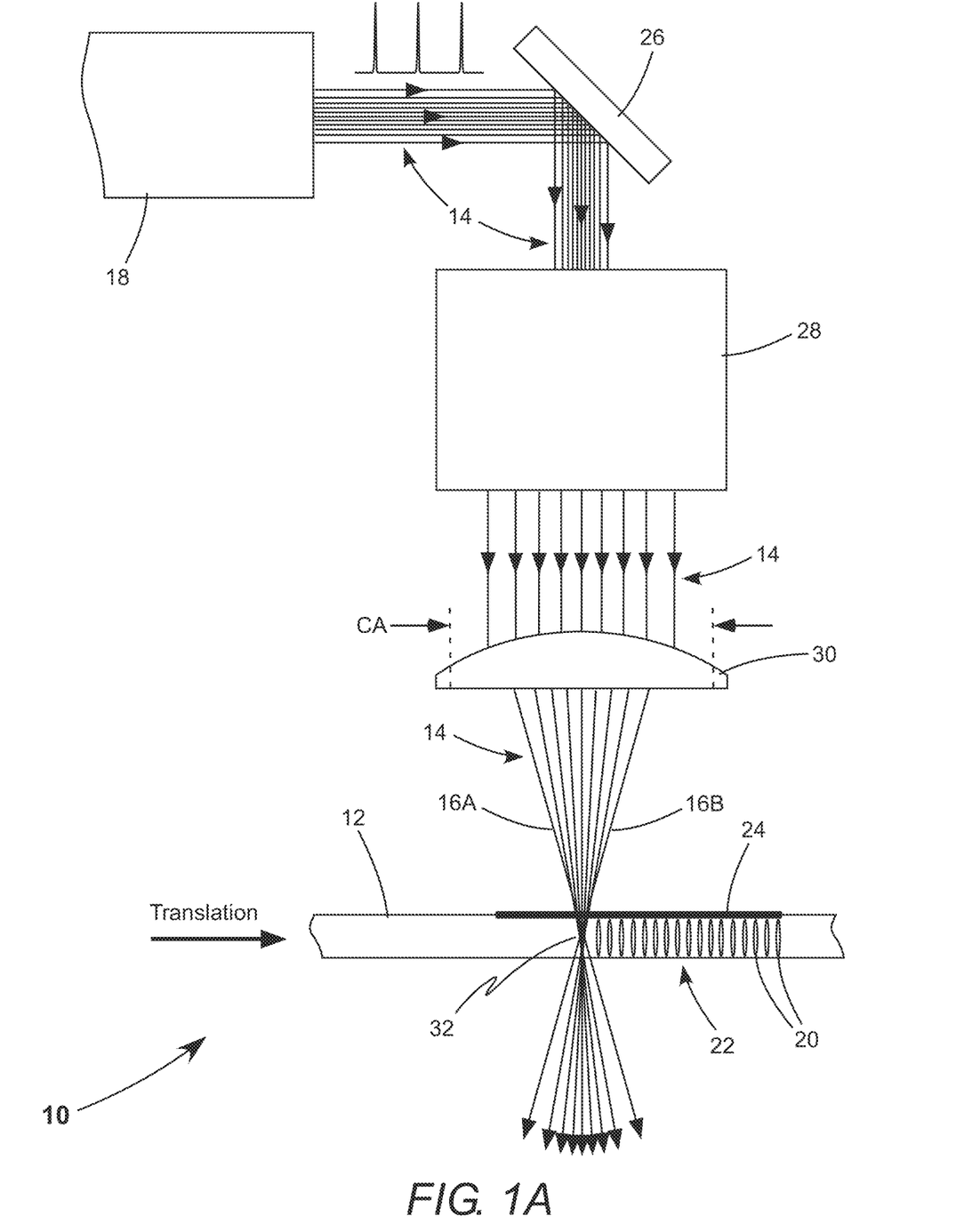
FIGS. 1A and 1B are side views, partially in cross section, schematically illustrating one preferred embodiment of a laser-cutting apparatus for implementing the separating and releasing method of the present invention, the apparatus including two laser-sources, each delivering a beam of laser-radiation that is directed to a workpiece to be cut and separated.
Figure 1B:
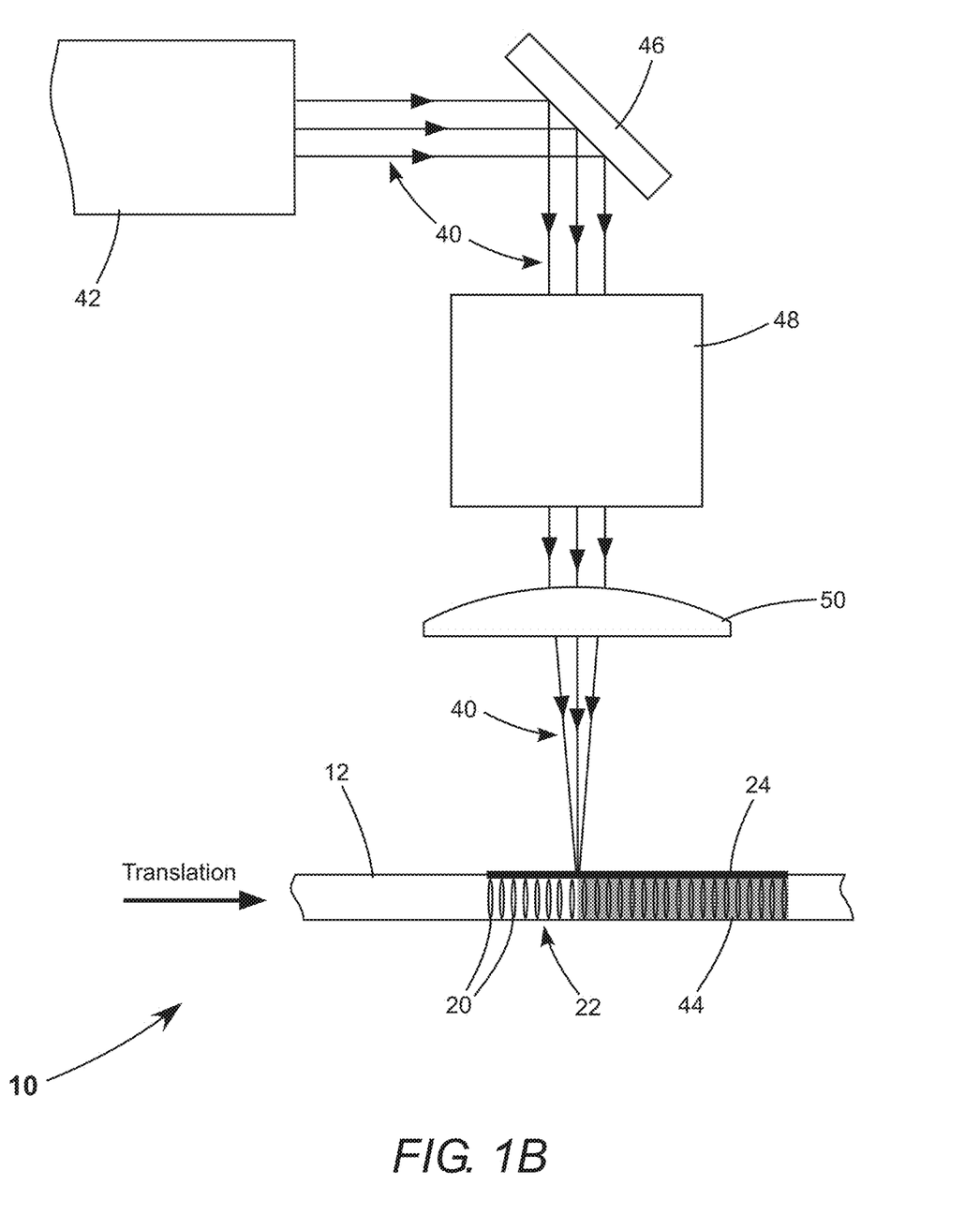

Referring now to the drawings, wherein like components are designated by like numerals, FIGS. 1A and 1B schematically illustrate an apparatus 10 used in a prior-art laser-cutting method and which is also used in the separating and releasing method of the present invention. In both the prior-art method and the current method, a workpiece 12 made of a brittle material is exposed to a focused beam of pulsed laser-radiation 14. Focusing of beam of pulsed laser-radiation 14 is indicated by converging rays 16A and 16B, representing the boundary rays of the focused beam of laser-radiation. Beam of pulsed laser-radiation 14 is generated by a source of pulsed laser-radiation 18 and has a wavelength at which the brittle material is transparent. Beam of pulsed laser-radiation 14 is a beam of repeated individual laser-pulses (here, only three shown) or repeated bursts of lasers pulses. Each pulse or each burst of pulses creates a defect 20 in the workpiece.

An array 22 of defects 20 is created by translating workpiece 12 laterally with respect to beam of pulsed laser-radiation 14 as indicated by the arrow. The focused beam traces a cutting line 24, which follows the outline of an item to be cut from the workpiece. Here, a straight section of such an item is depicted in cross section, for convenience of illustration.

Apparatus 10 further includes an optional beam-steering optic 26, an optional beam-conditioning optic 28, and a focusing lens 30. FIG. 1A depicts beam-steering optic 26 as a plane mirror arranged to intercept beam of pulsed laser-radiation 14 from laser-source 18 and direct it towards workpiece 12. Beam-conditioning optic 28 is depicted as an afocal beam-expander arranged to intercept directed beam of pulsed laser-radiation 14 and expand it to mostly fill clear aperture CA of focusing lens 30. Focusing lens 30 is depicted as a plano-convex lens that is arranged to intercept expanded beam of pulsed laser-radiation 14 and bring it to focus in workpiece 12. Beam-steering optics and beam-conditioning optics are well known in the art of optical design and a description thereof is not necessary for understanding the principles of the present invention.

Focusing lens 30 could be a single-element lens as depicted or a multi-element lens assembly. Workpiece 12 is depicted being translated with respect to a stationary focused beam of pulsed laser-radiation 14. Alternatively, galvanometer-actuated mirrors could be included in beam-conditioning optic 28 and a flat-field objective lens used for focusing lens 30, thereby enabling focused beam of pulsed laser-radiation 14 to be translated with respect to a stationary workpiece 12.

Focused beam of pulsed laser-radiation 14 converges to an elongated focus 32. Rays emerging from near the center of focusing lens 28 converge further therefrom than boundary rays 16A and 16B. Workpiece 12 is located such that elongated focus 32 overlaps or at least partially overlaps with workpiece 12. An elongated focus has advantages in laser-cutting processes, particularly in processes that create filaments to form voids, because the focused laser-radiation is distributed to favor creation of long voids that extend through the thickness of the workpiece. An elongated focus is also advantageous in processes that use ablation to create long voids. By way of example, an elongated focus can be created by filling the clear aperture of a focusing lens having spherical aberration.

Both the prior-art method and the method of the present invention further include exposing workpiece 12 to a beam of laser-radiation 40 generated by a source of laser-radiation 42, which is depicted in FIG. 1B and is different from laser-source 18 of FIG. 1A. Beam of laser-radiation 40 has a wavelength that is absorbed by the brittle material. Workpiece 12 is translated laterally with respect to beam of laser-radiation 40. Typically, the beam is traced along array 22 of defects 20 created previously by beam of pulsed laser-radiation 14. Beam of laser-radiation 40 heats the brittle material weakened by defects 20, causing it to crack completely and creating a cut-edge 44, indicated in the drawing by shading.

Apparatus 10 further includes an optional beam-steering optic 46, an optional beam-forming optic 48, and an optional focusing lens 50. In some applications, beam-forming optic 48 transforms beam of laser-radiation 40 from a Gaussian transverse mode to a top-hat transverse mode. In some applications, an unfocused beam of laser-radiation 40 may be sufficient to completely cut workpiece 12. Otherwise, beam of laser-radiation 40 would need to be focused to illuminate a smaller area on a surface of workpiece 12. Workpiece 12 may be translated with respect to a stationary beam of laser-radiation 40 as depicted. Equally, the beam of laser-radiation may be scanned across a stationary workpiece.

Figure 2A:
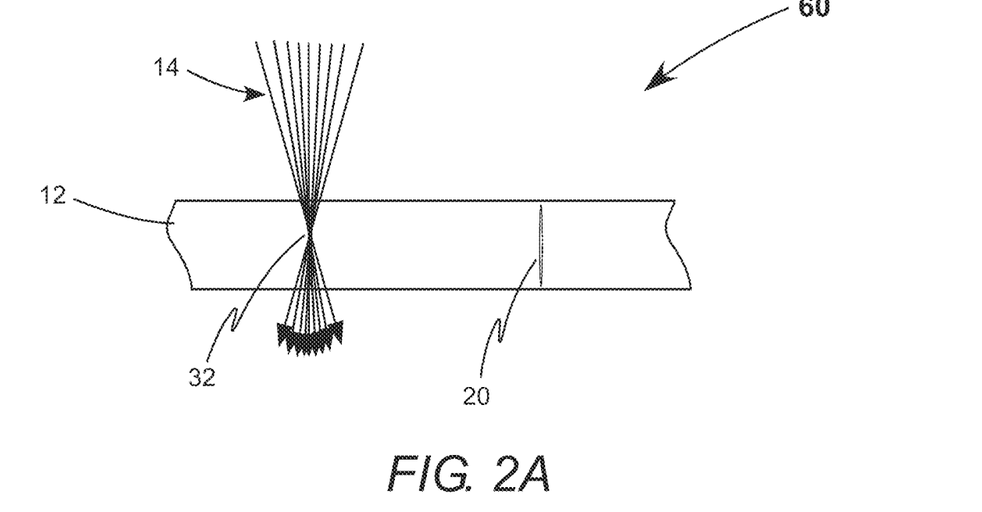
FIG. 2A is a cross-sectional side view and FIG. 2B is a plan view schematically illustrating preparation of a workpiece for the separating and releasing method of the present invention, by translating a beam of pulsed laser-radiation creating a plurality of defects along a cutting line.
Figure 2B:
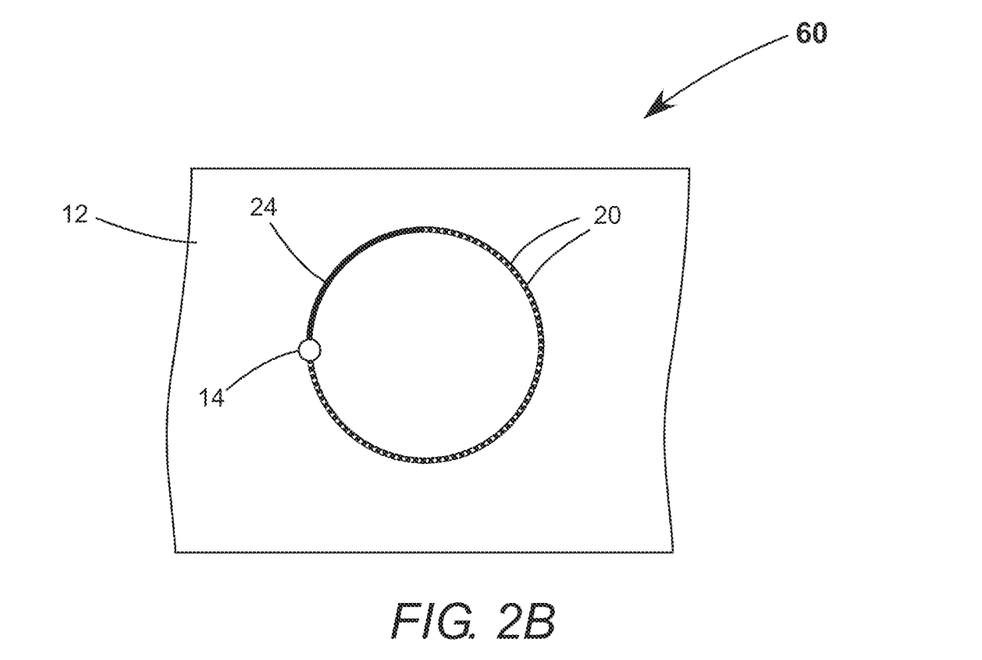
Figure 2C:
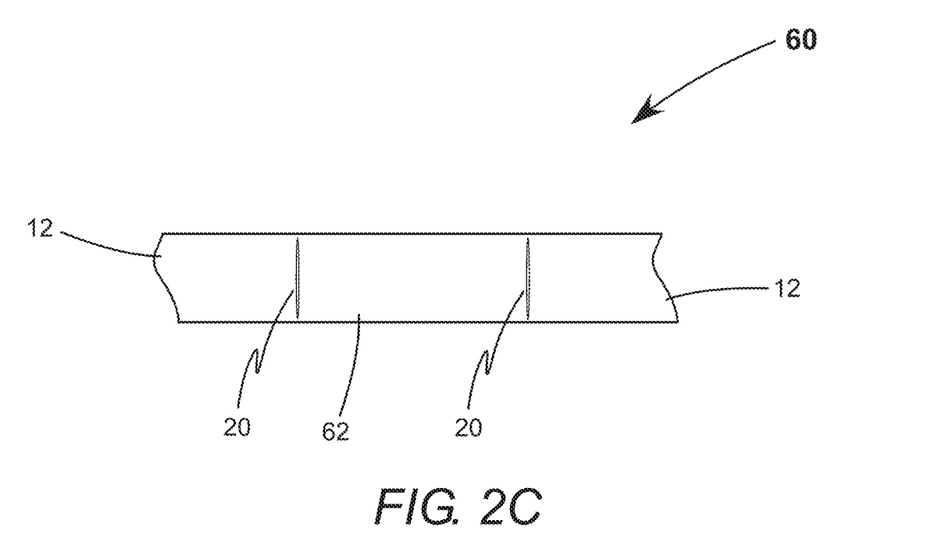
FIG. 2C is a cross-sectional side view and FIG. 2D is a plan view schematically illustrating the workpiece of FIGS. 2A and 2B after preparation, wherein the plurality of defects outline a closed-form piece within the workpiece.
Figure 2D:
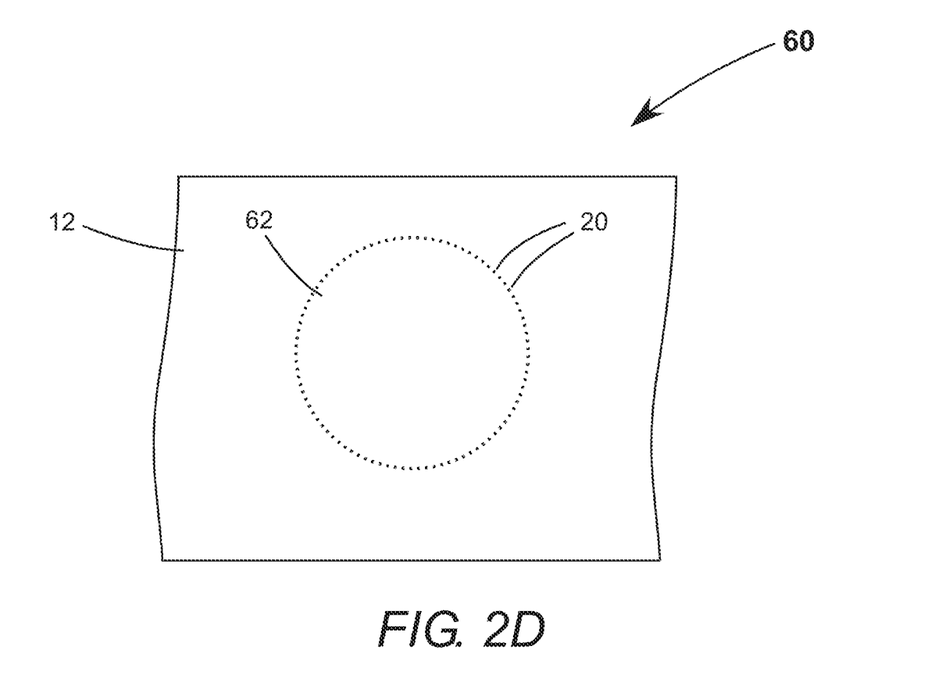

FIGS. 2A and 2B schematically illustrate a method 60 for preparing workpiece 12 for the separating and releasing method of the present invention using the apparatus of FIG. 1A. Focused beam of pulsed laser-radiation 14 is applied to workpiece 12 along cutting line 24, creating plurality of defects 20 that extend mostly or completely through the thickness of the workpiece. FIGS. 2A and 2B depict the focused beam of pulsed laser-radiation at one moment while it is being translated with respect to the workpiece along the cutting line. The beam is translated clockwise along an exemplary circular cutting line. FIGS. 2C and 2D schematically illustrate workpiece 12 after applying focused beam of pulsed laser-radiation 14 and translating it along the whole length of cutting line 24. Defects 20 define the outline of an exemplary closed-form piece 62 to be separated and released from the rest of the workpiece. Here, closed-form piece 62 has a circular shape, but the inventive method can be applied to a closed-form piece having any desired shape.

Figure 3A:
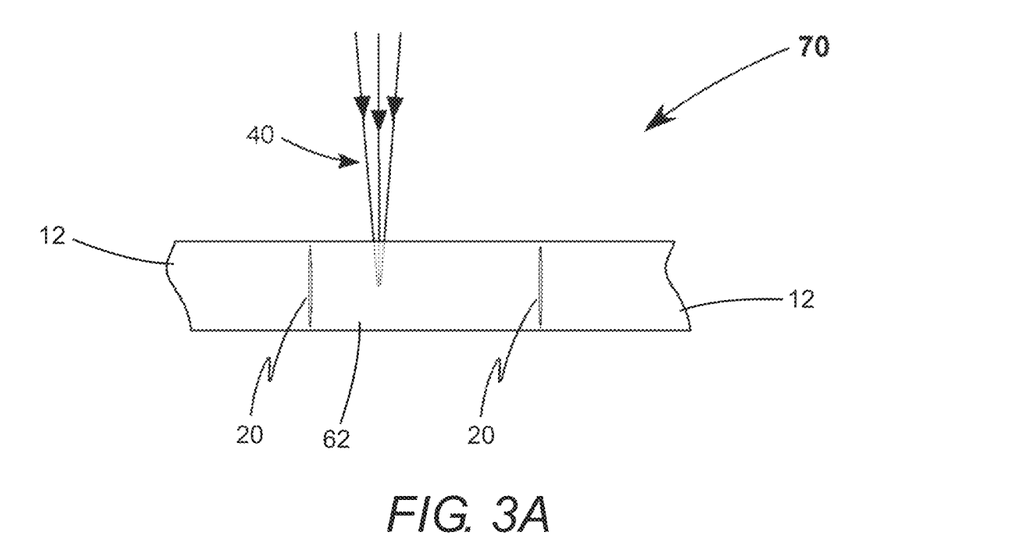
FIG. 3A is a cross-sectional side view and FIG. 3B is a plan view schematically illustrating a first application of a beam of laser-radiation to the closed-form piece of FIGS. 2C and 2D, which initiates cracking between the plurality of defects.
Figure 3B:
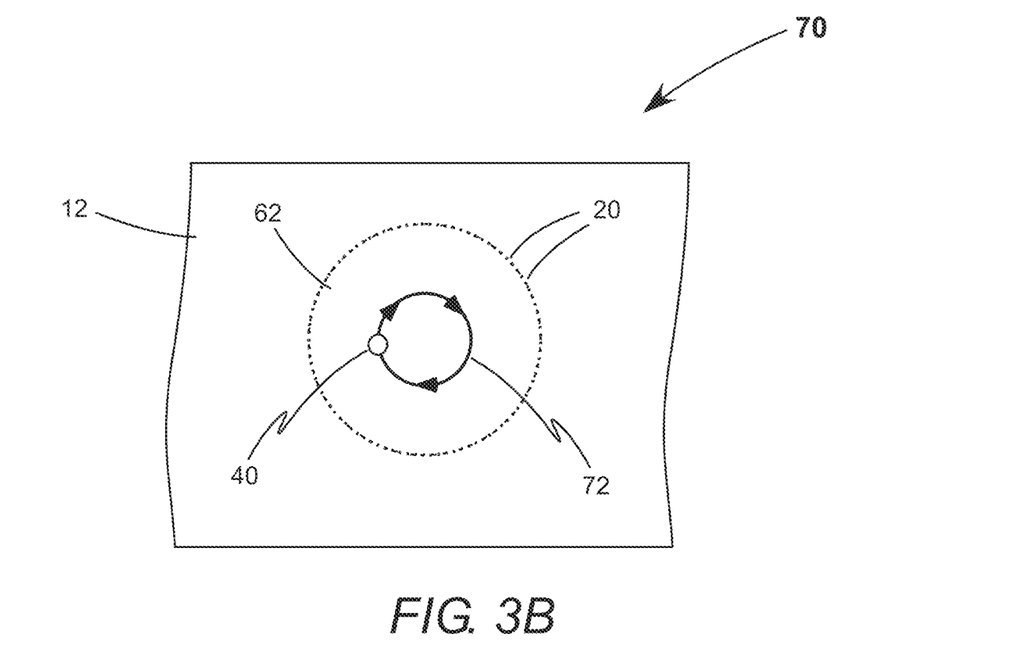

FIGS. 3A and 3B schematically illustrate one preferred embodiment of laser separating and release method 70 in accordance with the present invention using the apparatus of FIG. 1B. FIGS. 3A and 3B depict workpiece 12 prepared by method 60 depicted in FIGS. 2A and 2B, from which exemplary closed-form piece 62 is to be separated and released. Beam of laser-radiation 40 is applied for a first time to closed-form piece 62, thereby heating closed-form piece 62 and causing thermally induced stress, which initiates cracking between defects 20. Beam of laser-radiation 40 has a first power that is applied for a first duration. During this first application, the beam of laser-radiation is depicted being focused and translated with respect to the workpiece along an irradiation path 72 within the closed-form piece. The inventors have found rapid continuous translation along such an enclosed irradiation path to be a favorable for separating a circular closed-form piece. However, a stationary beam located near the center of the closed-form piece or a larger unfocused beam could be sufficient in many applications of the present invention.

Figure 4A:
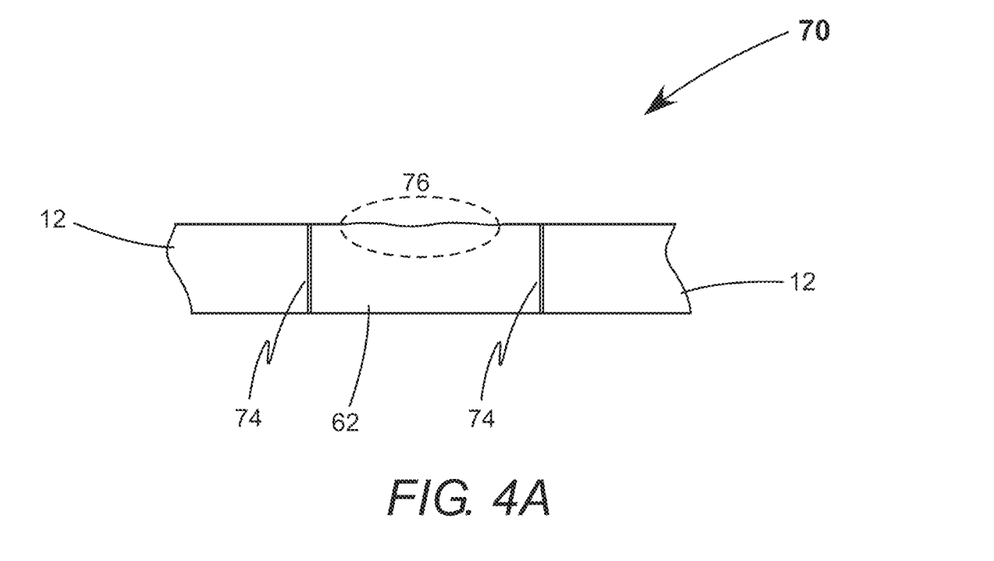
FIG. 4A is a cross-sectional side view and FIG. 4B is a plan view schematically illustrating the workpiece after pausing the application of the beam of laser-radiation in FIGS. 3A and 3B, the cracking propagating completely through the plurality of defects to separate the closed-form piece from the rest of the workpiece.
Figure 4B:
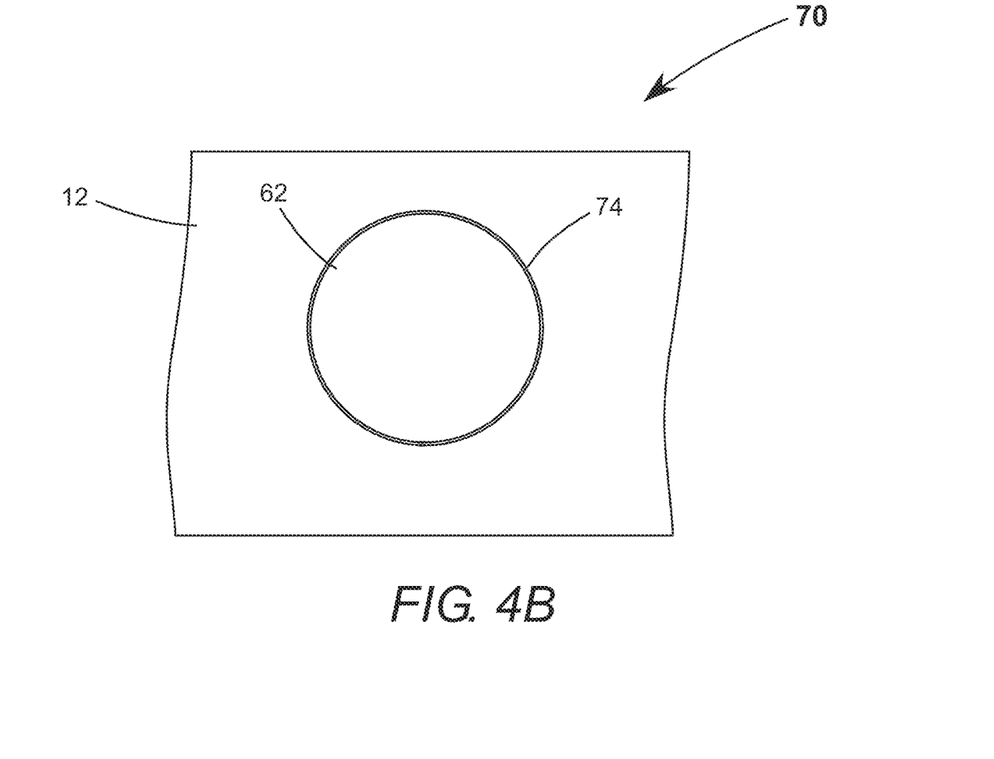

FIGS. 4A and 4B schematically illustrate workpiece 12 after pausing the application of beam of laser-radiation 40 depicted in FIGS. 3A and 3B. Here, "pausing" means reducing the power of beam of laser-radiation 40 incident on closed-form piece 62 for a wait duration. Pausing allows the closed-form piece to cool, which causes the cracking to propagate completely between the defects. There is a molecular separation along crack 74 between the closed-form piece and the rest of the workpiece, although the closed-form piece and the rest of the workpiece may still be in physical contact. If heating during the first application of the beam of laser-radiation is sufficient to cause melting and deformation in at least a portion 76 of the closed-form piece, crack 74 may include small gaps, due to contraction of the deformed closed piece during cooling. Such gaps may extend partially along crack 74. A plurality of gaps may extend fully along crack 74. Although separated, the closed-form piece remains bound inside the rest of the workpiece due to friction. Melting typically occurs on the irradiated surface of the closed-form piece, since that is where most of the laser-radiation is absorbed.

Preferably, the first power and the first duration are selected to minimize the laser-radiation energy (first power x first duration) applied during the first duration to reliably initiate cracking, thereby minimizing damage to an inside edge of workpiece 12 along crack 74. The first power, the first duration, the reduction in power, and the wait duration are together selected to heat the closed-form piece and then allow it to cool sufficiently for the cracking to reliably propagate completely between the defects. Here, "reducing the power of beam of laser-radiation 40" means a reduction sufficient to cause substantial cooling of closed-form piece 62; preferably a reduction of at least 80% from the first power, more preferably a reduction of at least 90% from the first power, and most preferably no power applied at all during the wait duration. In the claims, the term "pausing" is intended to include applying no power and a reduction in power. The first duration is preferably at least 0.1 second (s) and the wait duration is preferably at least 1 s. The processing parameters selected will depend in part on the brittle material and the thickness of the workpiece.

Figure 5A:
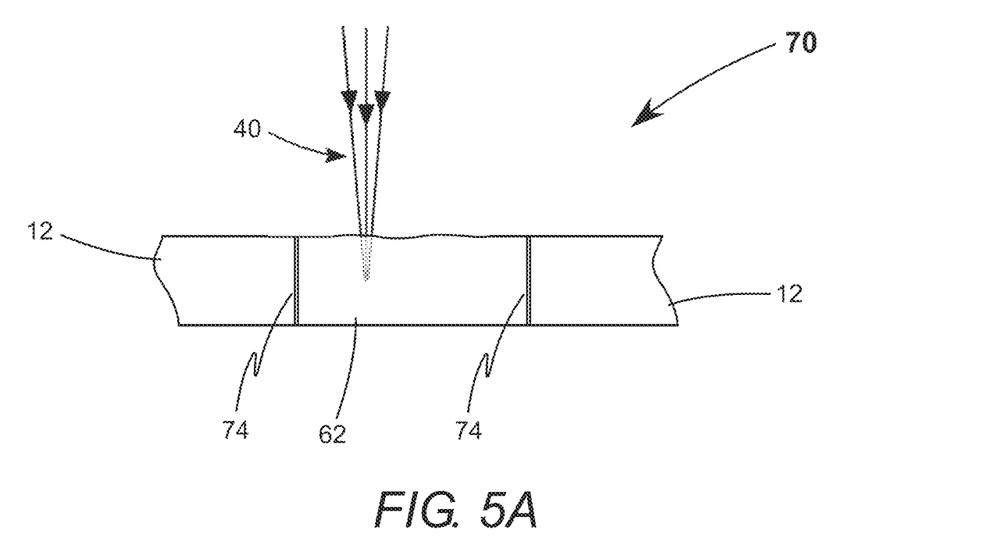
FIG. 5A is a cross-sectional side view and FIG. 5B is a plan view schematically illustrating a second application of the beam of laser-radiation to the separated closed-form piece of FIGS. 4A and 4B.
Figure 5B:
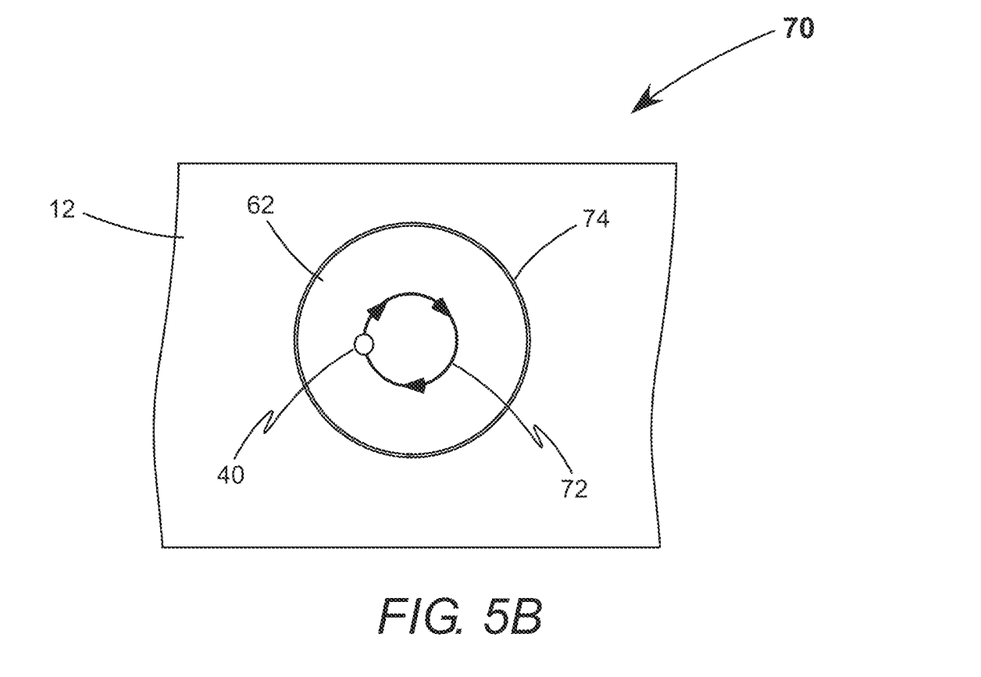

FIGS. 5A and 5B schematically illustrate applying beam of laser-radiation 40 for a second time to closed-form piece 62, after the end of the wait duration. Beam of laser-radiation 40 has a second power that is applied for a second duration. The second power and second duration are selected to melt and deform at least a portion of closed-form piece 62. The second duration is preferably at least 0.1 s. The second application of the beam of laser-radiation is similar to the first application depicted in FIGS. 3A and 3B, with an exception that crack 74 provides some thermal and physical isolation, particularly when there are small gaps between the closed-form piece and the rest of the workpiece. Therefore, the second application can generally be more aggressive than the first application. If necessary, more laser-radiation energy can be applied during the second application to produce more deformation, without causing micro-cracking or any other damage in the rest of the workpiece. By way of example, the laser-radiation energy applied during the second duration exceeds the laser-radiation energy applied during the first duration by a multiple greater than or equal to 1.5. In some instances, the temperature of the closed-form piece may still be above ambient following the wait duration, reducing the laser-radiation energy that must be applied during the second application.

Figure 6A:
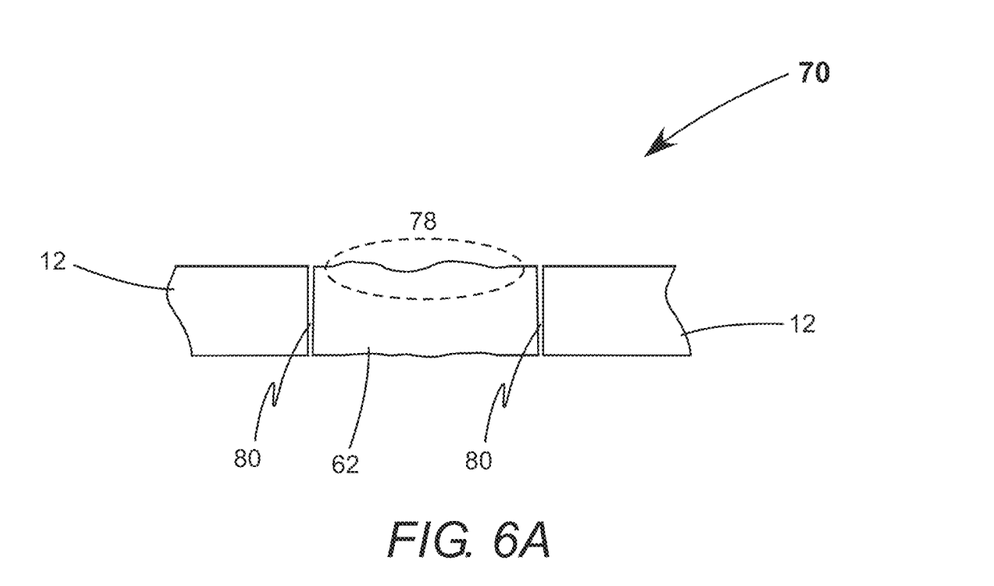
FIG. 6A is a cross-sectional side view and FIG. 6B is a plan view schematically illustrating the workpiece after cooling following the second application of the beam of laser-radiation of FIGS. 5A and 5B, the cooling opening a gap between the closed-form piece and the rest of the workpiece that is sufficient to release the workpiece.
Figure 6B:
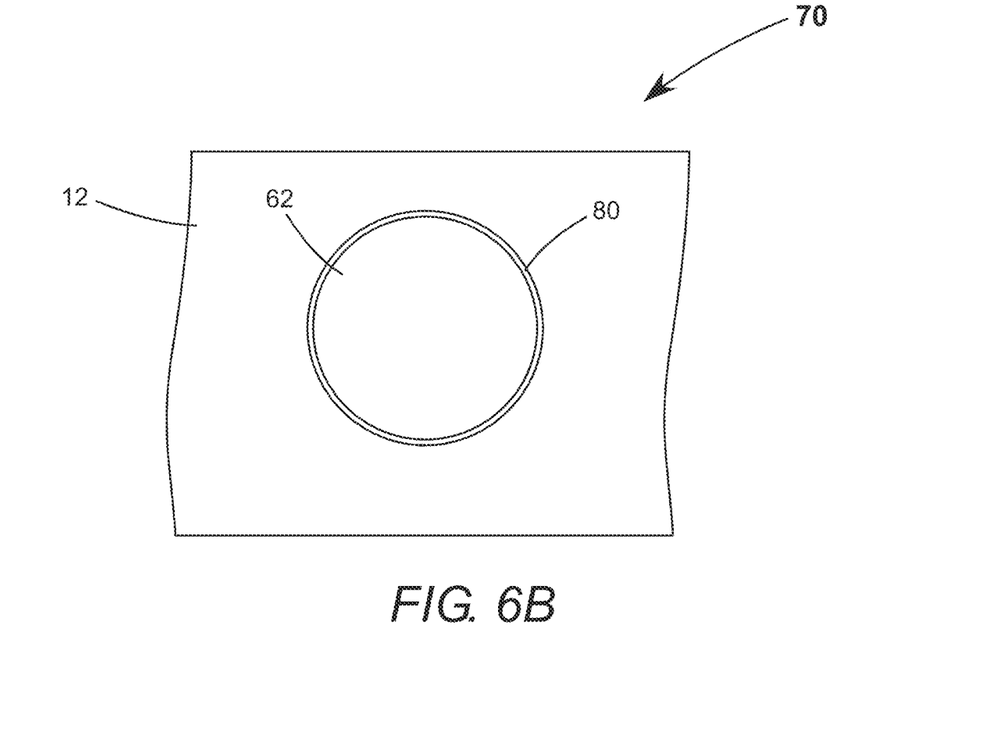

FIGS. 6A and 6B schematically illustrate closed-form piece 62 and the rest of workpiece 12 after cooling from the second application of beam of laser-radiation 40. Deformation in a melted portion 78 of closed-form piece 62 opens a gap 80 between the closed-form piece and the rest of the workpiece due to lateral contraction during cooling. Melting and deformation may extend through much of the closed-form piece, particularly for a small closed-form piece, if the second application of the beam of laser-radiation provides sufficient energy. This is depicted in FIG. 6A, wherein both the irradiated surface and an opposite surface of the closed-form piece exhibit some deformation. The first application of the beam of laser-radiation, which causes an initial separation by creating crack 74, enables such aggressive heating without damaging the rest of the workpiece.

If gap 80 is large enough, the closed-form piece can release spontaneously. For example, by falling from the rest of the workpiece due to gravity. Reliable spontaneous release is usually preferred. Otherwise, the closed-form piece can be released by applying a relatively modest force, due to gap 80. An alternative way to induce release is to apply ultrasonic energy to the closed-form piece and/or the rest of the workpiece.

In a practical example of the present invention using apparatus 10, method 60, and method 70 to separate and release a round closed-form piece from soda lime glass, laser-source 18 is a "HyperRapid NX" ultra-short pulsed laser and laser-source 42 is a "SR 15i" $CO_2$ laser, both supplied by Coherent Inc. of Santa Clara, Calif. Beam of pulsed laser-radiation 14 is focused by a "SmartCleave" optic, also supplied by Coherent Inc., having a nominal focal length of 15 mm. Exemplary closed-form piece 62 has a diameter of about 3.5 mm and glass workpiece 12 has a thickness of about 0.3 mm. Laser-source 18 produces pulses having a duration of between about 10 and 15 ps. Beam of pulsed laser-radiation 14 has a wavelength of 1064 nanometers (nm). Bursts of eight individual pulses having a burst-energy of about 850 micro-Joule (µJ) at a burst-repetition-rate of about 115 kilohertz (kHz) are selected. These processing parameters create defects in the form of voids in the glass workpiece. The defects have a pitch distance of about 5 µm.

Laser-source 42 has a wavelength of about 10,600 nm. Both the first power and the second power are selected to be about 28 watts (W). Beam of laser-radiation 40 illuminates an area on closed-form piece 62 having a diameter of about 2 mm. The center of the beam of laser-radiation is translated along a circular irradiation path 72 around the center of the closed-form piece, having a diameter of about 0.45 mm. The beam is translated at a speed of about 1000 mm/s. The beam completes about 300 circuits of the irradiation path during the first application and about 450 circuits during the second application, corresponding to a first duration of about 0.4 s and a second duration of about 0.6 s. The wait duration is at least 2 s and is preferably about 4 s.

The present invention can be applied to workpieces made of other types of glass, such as aluminosilicate glass, borosilicate glass, or chemically-strengthened glass. The present invention can be used to separate and release closed-form pieces having other shapes. It is particularly effective for separating and releasing closed-form pieces having a largest linear dimension of up to 5 mm. A pitch distance between defects of 1 µm to 10 µm is preferred and a pitch distance of 2 µm to 6 µm is more preferred.

The present invention is described above in terms of a preferred embodiment and other embodiments. The invention is not limited, however, to the embodiments described and depicted herein. Rather, the invention is limited only by the claims appended hereto.

What is claimed is:

1. A method for separating and releasing a closed-form piece from a workpiece made of a brittle material using a beam of laser-radiation, the method comprising:
   providing a workpiece having a plurality of defects along an outline of the closed-form piece created by laser processing;
   applying the beam of laser-radiation to the closed-form piece for a first duration, the beam of laser-radiation initiating cracking between the defects;
   after the first duration, pausing application of the beam of laser-radiation until the cracking has propagated completely between the defects; and
   after the cracking has propagated completely between the defects, applying the beam of laser-radiation for a second duration, the beam of laser-radiation heating at least a portion of the closed-form piece to deform the closed-form piece;
   wherein contraction of the deformed closed-form piece during cooling after the second duration opens a gap between the closed-form piece and the rest of the workpiece, and wherein the application of the beam of laser-radiation during the first and second durations is within the closed-form piece and spaced apart from the outline of the closed-form piece.

2. The separating and releasing method of claim 1, wherein the defects were created by laser filaments formed by focusing a beam of pulsed laser-radiation.

3. The separating and releasing method of claim 1, wherein the defects are in the form of voids.

4. The separating and releasing method of claim 1, wherein the beam of laser-radiation is generated by a $CO_2$ laser.

5. The separating and releasing method of claim 1, wherein the first duration is at least 0.1 seconds.

6. The separating and releasing method of claim 1, wherein the duration of the pausing step is at least one second.

7. The separating and releasing method of claim 1, wherein the second duration is at least 0.1 seconds.

8. The separating and releasing method of claim 1, wherein the second duration is longer than the first duration.

9. The separating and releasing method of claim 1, wherein more laser-radiation energy is applied during the second duration than during the first duration.

10. The separating and releasing method of claim 1, wherein laser-radiation energy applied during the second duration exceeds laser-radiation energy applied during the first duration by a multiple greater than or equal to 1.5.

11. The separating and releasing method of claim 1, wherein the largest linear dimension of the closed-form piece is less than 5 millimeters.

12. The separating and releasing method of claim 1, wherein the brittle material is a glass.

13. The separating and releasing method of claim 1, wherein the closed-form piece is released from the rest of the workpiece spontaneously after the opening of the gap.

14. The separating and releasing method of claim 1, further comprising a step of applying ultrasonic energy to the closed-form piece, thereby causing release of the closed-form piece from the rest of the workpiece.

15. The separating and releasing method of claim 1, further comprising a step of applying ultrasonic energy to the rest of the workpiece, thereby causing release of the closed-form piece from the rest of the workpiece.

16. A method for separating and releasing a closed-form piece from a workpiece made of a brittle material using a beam of laser-radiation, the method comprising:
    providing a workpiece having a plurality of defects along an outline of the closed-form piece created by laser processing;
    applying the beam of laser-radiation to the closed-form piece for a first duration, the beam of laser-radiation initiating cracking between the defects;
    after the first duration, pausing application of the beam of laser-radiation for at least one second; and
    after said pausing, applying the beam of laser-radiation for a second duration, the beam of laser-radiation heating at least a portion of the closed-form piece to deform the closed-form piece;
    wherein more laser-radiation energy is applied during the second duration than during the first duration, and cooling after the second duration opens a gap between the closed-form piece and the rest of the workpiece, and wherein the application of the beam of laser-radiation during the first and second durations is within the closed-form piece and spaced apart from the outline of the closed-form piece.

17. The separating and releasing method of claim 16, wherein the defects were created by laser filaments formed by a focused beam of pulsed laser-radiation.

18. The separating and releasing method of claim 16, wherein the defects are in the form of voids.

19. The separating and releasing method of claim 16, wherein the beam of laser-radiation is generated by a $CO_2$ laser.

20. A method for creating, separating and releasing a closed-form piece from a workpiece made of a brittle material, the method comprising:
   forming a plurality of defects in the workpiece along an outline of the closed-form piece using a pulsed first laser beam from a first laser;
   applying a second laser beam from a second laser to the closed-form piece for a first duration, the second laser beam initiating cracking between the defects;
   after the first duration, pausing application of the second laser beam until the cracking has propagated completely between the defects; and
   after the cracking has propagated completely between the defects, applying the second laser beam to the closed-form piece for a second duration, the second laser beam heating at least a portion of the closed-form piece to deform the closed-form piece;
   wherein contraction of the deformed closed-form piece during cooling after the second duration opens a gap between the closed-form piece and the rest of the workpiece, and wherein the application of the second laser beam during the first and second durations is within the closed-form piece and spaced apart from the outline of the closed-form piece.

21. The separating and releasing method of claim 20, wherein the duration of the pausing step is at least one second.

22. The separating and releasing method of claim 20, wherein more laser energy is applied during the second duration than during the first duration.

* * * * *